(12) United States Patent
Krishna et al.

(10) Patent No.: US 9,027,236 B2
(45) Date of Patent: May 12, 2015

(54) RESONATOR STRUCTURES AND METHOD OF MAKING

(75) Inventors: Kalaga Murali Krishna, Bangalore (IN); Sudhakar Eddula Reddy, Bangalore (IN); Lohit Matani, Varanasi (IN)

(73) Assignee: General Electric Company, Niskayuna, NY (US)

( * ) Notice: Subject to any disclaimer, the term of this patent is extended or adjusted under 35 U.S.C. 154(b) by 916 days.

(21) Appl. No.: 13/118,663

(22) Filed: May 31, 2011

(65) Prior Publication Data

US 2012/0306280 A1 Dec. 6, 2012

(51) Int. Cl.
*H01P 11/00* (2006.01)
*H01P 7/00* (2006.01)
*H02J 17/00* (2006.01)

(52) U.S. Cl.
CPC .............. *H01P 11/008* (2013.01); *H01P 7/00* (2013.01); *H02J 17/00* (2013.01)

(58) Field of Classification Search
CPC .......... H01P 7/00; H01P 11/008; H02J 17/00
USPC .................. 333/219; 29/602.1, 825; 307/104
See application file for complete search history.

(56) References Cited

U.S. PATENT DOCUMENTS

| | | | | |
|---|---|---|---|---|
| 5,856,770 | A * | 1/1999 | Mantese et al. | 333/182 |
| 7,060,350 | B2 | 6/2006 | Takaya et al. | |
| 7,081,753 | B2 * | 7/2006 | Mullen et al. | 324/318 |
| 7,290,315 | B2 * | 11/2007 | Palanduz et al. | 29/25.41 |
| 7,545,242 | B2 * | 6/2009 | Beausoliel et al. | 333/239 |
| 2003/0080826 | A1 * | 5/2003 | Chen et al. | 333/117 |
| 2004/0175585 | A1 * | 9/2004 | Zou et al. | 428/469 |
| 2004/0196620 | A1 * | 10/2004 | Knudsen et al. | 361/311 |
| 2008/0044660 | A1 | 2/2008 | Takaya et al. | |
| 2009/0027280 | A1 | 1/2009 | Frangioni et al. | |
| 2010/0115474 | A1 * | 5/2010 | Takada et al. | 716/1 |

(Continued)

OTHER PUBLICATIONS

Benmerah et al., "Dielectric Spiral Resonators", Electronics Letters, Apr. 29, 2010,vol. 46, Issue 9, pp. 608-609.

(Continued)

*Primary Examiner* — Benny Lee
*Assistant Examiner* — Rakesh Patel
(74) *Attorney, Agent, or Firm* — Paul J. DiConza

(57) ABSTRACT

A resonator in the Swiss-roll structure, method of making the resonator structure and the system employing the resonator are disclosed. The resonator includes a plurality of layers, including a ceramic layer and a metallic layer. The ceramic and metallic layers are configured in a Swiss-roll form such that the neighboring ceramic layers are separated by the metallic layer. Further, the ceramic layer includes materials that have a dielectric constant of at least about 10 and dielectric loss tangent less than about 0.01 in the frequency range of about 1 KHz to about 100 MHz. The method of forming the resonator includes the steps of disposing a metallic layer, depositing a dielectric ceramic layer, and forming a Swiss-roll structure of the metallic and ceramic layers. Alternate method includes swaging the dielectric material filled metal tubes and forming into Swiss-rolls. Further steps include heat treating the resultant Swiss-roll structure in vacuum, inert atmosphere, or reducing atmosphere to form a monolithic Swiss-roll structure, such that the air gap between turns of the Swiss-roll structure is less than about 1 μm.

6 Claims, 5 Drawing Sheets

(56) References Cited

U.S. PATENT DOCUMENTS

2010/0171426 A1 7/2010 Kloss et al.
2010/0176727 A1 7/2010 Graef et al.

OTHER PUBLICATIONS

Bohori et al., "Contactless Power Transfer System and Method" Pending U.S. Appl. No. 12/731,497, filed Mar. 25, 2010, 27 Pages.

Kalaga et al., "Dielectric Materials", Pending U.S. Appl. No. 13/075,911, filed Mar. 30, 2011, 69 Pages, Part A.

Kalaga et al., "Dielectric Materials", Pending U.S. Appl. No. 13/075,911, filed Mar. 30, 2011, 31 Pages, Part B.

Kalaga et al., "Dielectric Materials", Pending U.S. Appl. No. 13/075,997, filed Mar. 30, 2011, 69 Pages, Part A.

Kalaga et al., "Dielectric Materials", Pending U.S. Appl. No. 13/075,997, filed Mar. 30, 2011, 31 Pages, Part B.

\* cited by examiner

RESONATOR STRUCTURES AND METHOD OF MAKING

BACKGROUND

The invention relates generally to resonator structures. More particularly, the invention relates to resonators and method of making the resonator structures.

Self-resonating electromagnetic resonating structures are used in many different applications like microwave filters, RF antennas etc. The frequency of resonance of an electromagnetic resonating structure is inversely related to the diameter of the structure. However, for high power applications, it is required to have resonance frequencies lower than 1 MHz while keeping the diameter of structure still less than about 20-50 cm. These requirements can be met by embedding the resonating structure in high dielectric permittivity material to enhance the self-capacitance and thereby reduce the frequency of resonance. The conflicting properties of metal and ceramic pose a challenge in realizing dielectric materials having high permittivity and low loss processed in a way to form a thin layered monolithic structure between the high electrical conducting metallic resonating structure elements and dielectric materials. Further, the brittle ceramic nature of the dielectric material challenges the processing into required resonator structures.

BRIEF DESCRIPTION

Briefly, in one embodiment, a resonator is provided. The resonator includes a plurality of layers, including a ceramic layer and a metallic layer. The ceramic and metallic layers are configured in a Swiss-roll form such that the neighboring ceramic layers are separated by the metallic layer. Further, the ceramic layer includes materials that have a dielectric constant of at least about 10 and dielectric loss tangent less than about 0.01 in the frequency range of about 1 KHz to about 100 MHz.

In one embodiment, a method of forming a resonator is disclosed. The method includes the steps of disposing a metallic layer, depositing a dielectric ceramic layer, and forming a Swiss-roll structure of the metallic and ceramic layers. Further steps include heat treating the resultant Swiss-roll structure in vacuum, inert atmosphere, or reducing atmosphere to form a monolithic Swiss-roll structure, such that the air gap between turns of the Swiss-roll structure is less than about 1 μm.

In one embodiment, a method of forming a resonator is disclosed. The method includes the steps of disposing a metallic hollow tube, filling-in the metallic hollow tube with a dielectric ceramic material to form a filled metallic tube, swaging or rolling the filled metallic tube to form a layered structure comprising a ceramic layer in between two metallic layers, and winding the layered structure to form a Swiss-roll structure of metallic layer and ceramic layer. Further steps include heat treating the resultant Swiss-roll structure in vacuum, inert atmosphere, or reducing atmosphere to form a monolithic Swiss-roll structure, such that the air gap between turns of the Swiss-roll structure is less than about 1 μm.

In one embodiment, a power transfer system is provided. The power transfer system includes a first coil coupled to a power source, a second coil coupled to a load, and a field-focusing element disposed between the first coil and the second coil. The field focusing element includes a dielectric resonator and the dielectric resonator includes a plurality of layers, including a ceramic layer and a metallic layer. The ceramic and metallic layers are configured in a Swiss-roll form such that the neighboring ceramic layers are separated by the metallic layer. Further, the ceramic layer includes materials that have a dielectric constant of at least about 10 and dielectric loss tangent less than about 0.01 in the frequency range of about 1 KHz to about 100 MHz.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present invention generally provides a metal and ceramic layered Swiss-roll structure and a method for forming the Swiss-roll structure.

The present invention is generally applicable to components that require a structure with metallic and ceramic layers fabricated in a Swiss-roll structure such that the neighboring ceramic layers are separated by the metallic layer. Notable examples of such components include self-resonating electromagnetic resonating structures. While the advantages of this invention will be described with reference to resonators used in field focusing elements of contactless power transfer systems, the teachings of the invention are generally applicable to any component in which a ceramic-metal layered Swiss-roll structure described herein are employed.

Figure 1:
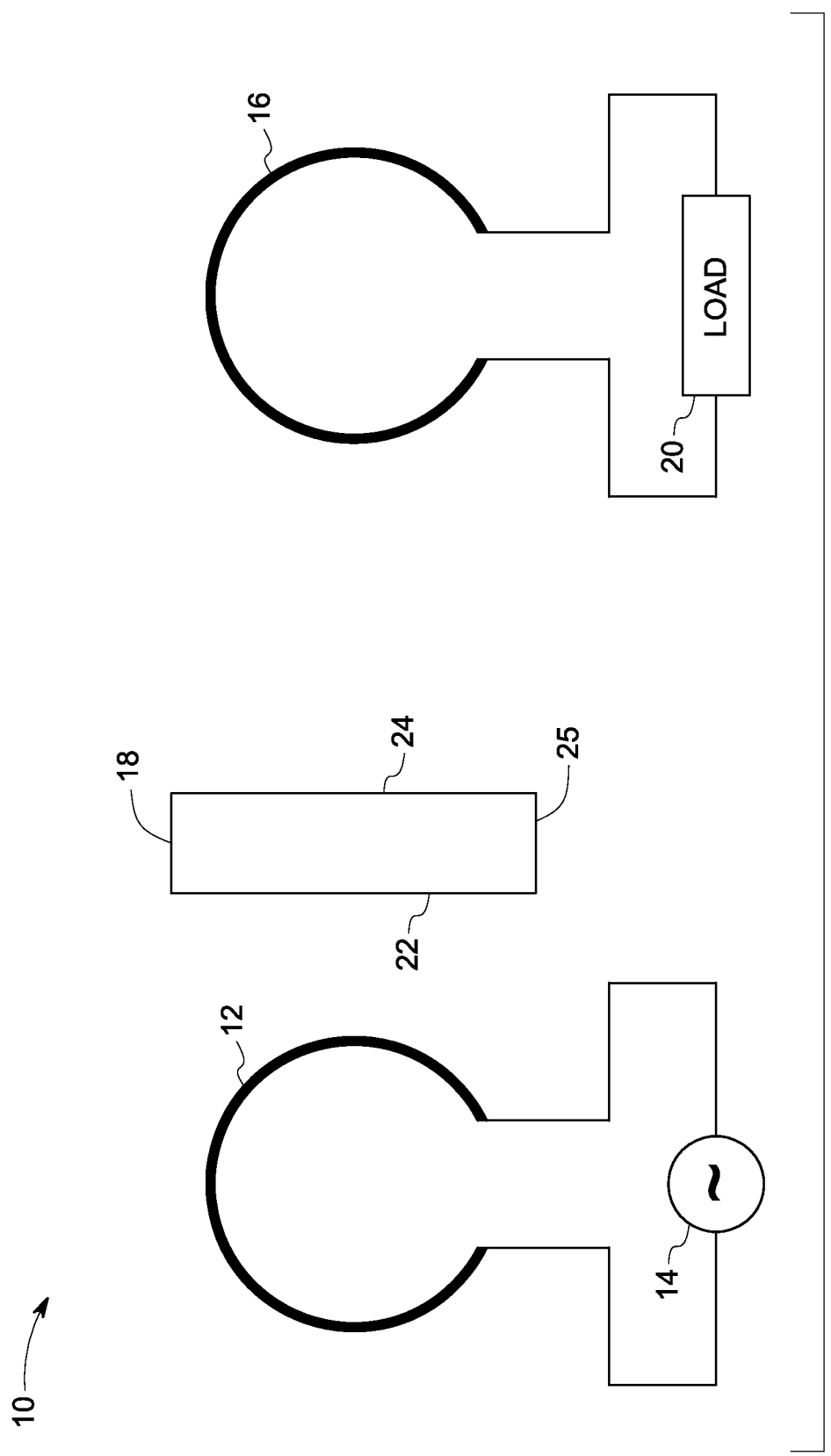
FIG. 1 illustrates an example system including a dielectric component employing a resonator according to an embodiment of the invention.

FIG. 1 illustrates an exemplary system 10 employing a Swiss-roll resonator structure according to an embodiment of the invention. In this example, a contactless power transfer system includes a first coil 12 coupled to a power source 14 and configured to produce a magnetic field (not shown). A second coil 16 is configured to receive power from the first coil 12 and distribute to a load 20. A dielectric component in the form of a field focusing element 18, including a Swiss-roll structured resonator according to an embodiment of the present invention is disposed between the first coil 12 and the second coil 16 for focusing the magnetic field from power source 14. The field focusing element may be used to focus magnetic fields and/or electro-magnetic fields.

Figure 2:
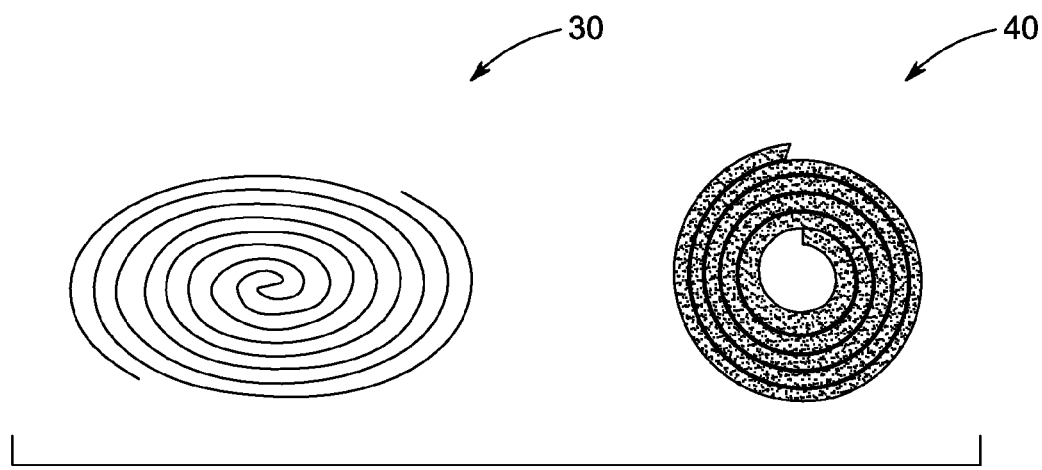
FIG. 2 illustrates examples of Swiss-roll structure, according to an embodiment of the invention.

FIG. 2 illustrates two example variations 30, 40 of a Swiss-roll structure that can be advantageously used as a resonator; many other variations will be apparent to one skilled in the art. Selection of a structure for a particular application is determined by the size and self-resonating frequency of the field focusing element. For example, in low power applications (less than about 1 Watt, for example), a resonance frequency up to about 1000 MHz is feasible. In high power applications (from about one hundred watts to about 500 kilowatts, for example), the resonance frequency of the order of several hundred kHz is feasible. In certain applications, the choice of frequency and hence the design of the field focusing element is driven by the restrictions on human exposure to high frequency electric and magnetic fields.

Swiss-roll structure 30, 40 may be used to provide a compact resonator that may be configured to operate at frequencies from about 100 kHz up to about 100 MHz. Swiss-roll embodiments may be used, for example, to provide extended magnetic field focusing strength and help achieve increased capacitance and/or inductance and hence a compact design due to size reduction in the spatial structure of the coils. A Swiss-roll structure 40 is further described in the following paragraphs in detail.

Figure 3:
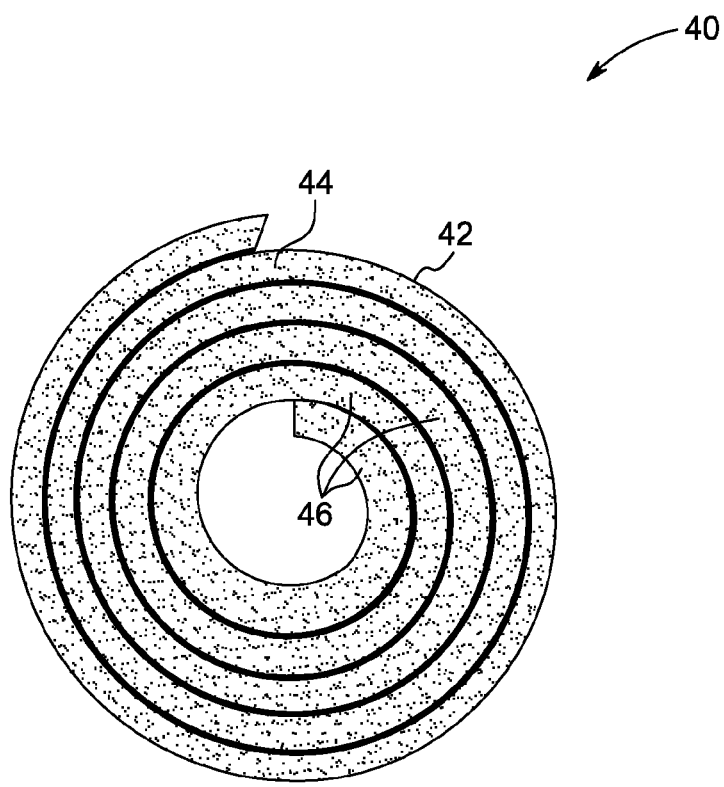
FIG. 3 illustrates parts of a Swiss-roll structure, according to an embodiment of the invention.

In one embodiment, a resonator having a Swiss-roll structure 40 is provided as depicted in FIG. 3. The resonator includes a metallic layer 42 and a ceramic layer (dielectric layer) 44. The Swiss-roll structure has a plurality of turns 46. A "turn" is hereby defined as a combined winding of one ceramic layer and at least one metallic layer. In one embodiment the Swiss-roll structure is limited to 2 turns 46, while in various other embodiments, the Swiss-roll structure has more than 2 turns as depicted in FIG. 3. In one embodiment, the Swiss-roll structure 40 has up to about 100 turns.

In one embodiment, the metal resonator layer (metallic layer) 42 includes copper, silver, aluminum, iron, gold, nickel, palladium, indium, gallium, zinc, lead, tin, platinum or any combination of the foregoing materials. In a particular embodiment, the metallic layer 42 is made up of one or more materials selected from the group consisting of copper, silver, aluminum, or any combination thereof. In an exemplary system, the metallic layer 42 comprises copper. In some embodiments, the metallic layer 42 can further have a silver or gold plating of few micro meters to few tens of micro meters to reduce the skin resistance losses.

A metal resonator layer 42 or an array of metal resonator layers 42 can be embedded in a material having high dielectric constant (dielectric permittivity) or a magnetic material having high permeability or magneto-dielectric medium having high dielectric permittivity and high permeability to achieve lower resonant frequency with a smaller sized resonator. High permeability material enhances self-inductance of the resonator and high permittivity material enhances self-capacitance of the resonators to reduce the frequency of resonance. A detailed description of structure, composition, and working principle of field focusing elements that can utilize a resonator having the presently described Swiss-roll structure can be found in a co-pending application titled "CONTACTLESS POWER TRANSFER SYSTEM AND METHOD" with Ser. No. 12/731,497 filed on 25 Mar. 2010.

The high permeability or permittivity materials can be used as the embedding materials in the form of ceramic layer 44 of Swiss-roll structure 40. In one embodiment, the ceramic layer 44 is a high permittivity material with dielectric constant of at least about 10 and dielectric loss tangent less than about 0.01 in the frequency range of about 1 KHz to about 100 MHz.

The structure including alternating metallic layer 42 and dielectric layer 44 in Swiss-roll form provides for high distributed capacitance and inductance that helps in achieving lower resonance frequency with the given size of resonator. Use of high dielectric permittivity material further reduces the resonance frequency. The thickness of dielectric layer 44 is a compromise between the increased capacitance with thinner layer verses reduced electrical breakdown strength. Similarly, the thickness of metallic layer is a function of current handling capacity and skin resistance losses.

Accordingly, in one embodiment, the metallic layer 42 has a thickness in the range from about 0.1 mm to about 10 mm. In a particular embodiment, the thickness of the metallic layer 42 is in the range from about 1 mm to about 10 mm The thickness of the dielectric layer 44 varies depending on the required resonating frequencies of the field focusing Swiss-roll element. In one embodiment, the ceramic layer 44 has a thickness in the range from about 0.01 mm to about 10 mm. In a particular embodiment, the thickness of the ceramic layer 44 is in the range from about 0.1 mm to about 1 mm In one embodiment, the ceramic layer 44 is a sintered layer comprising a plurality of ceramic particles sintered together. The sintered ceramic layer may be obtained by heat treating the ceramic layer at a temperature less than the melting point of the materials of ceramic and the adjacent metallic layer. In one embodiment, the ceramic dielectric materials of the ceramic layer 44 have a melting point less than about 1500° C. In a further embodiment, the sintering temperature of the materials of ceramic layer 44 is less than the melting point of the materials of metallic layer 42. An average particle size of the ceramic powders that are used to form the ceramic layer 44 varies from about 10 nm to 100 μm. In a particular embodiment, an average grain size of the ceramic layer 44 is in the range from about 100 nm to 10 μm. In one embodiment, the ceramic layer has porosity less than about 10 volume percent of the layer 44. In a further embodiment, the porosity of the ceramic layer 44 is less than about 5 volume %. In one embodiment, porosity present in the ceramic layer is discrete porosity.

For the purposes of this description, the term "discrete porosity" is defined as the pore volume percentage, in which pore connections are limited to, at most, a first-order connected pore. A "first-order connected pore" as the term used herein comprises a first pore to which one or more adjacent pores are connected, where the adjacent pore is not connected to any other pore than the first pore. Of course, one skilled in the art will recognize that an occasional defect is to be expected in fabricating such structures, and so a structure containing occasional defects (such as, for example, less than 5% of the adjacent pores are connected to the pores other than the first pore.) will still be considered a structure with substantially discrete porosity.

Figure 4:
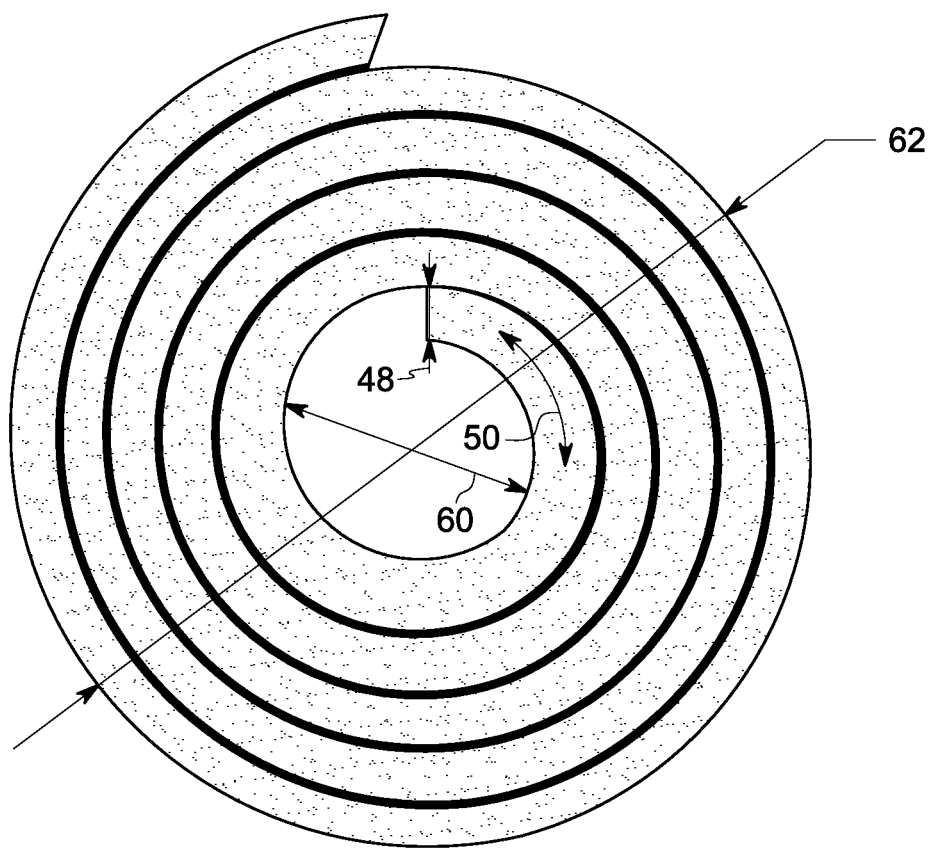
FIG. 4 illustrates parts and dimensions of a Swiss-roll structure, according to an embodiment of the invention.

The ceramic layer 44 is a single layer of a dielectric material. The term single layer is herein used to describe the uniform properties of the ceramic layer 44 in the direction of its thickness 48 (FIG. 4) in between metallic layers 42 of the successive turns 46. However, in a particular embodiment, the ceramic layer 44 may have different compositions in the length 50 of the ceramic layer 44. In a particular embodiment, the ceramic layer 44 has a dielectric material composition that varies progressively along the length 50 of the ceramic layer 44.

A compact, ceramic-metal interlayered Swiss-roll structured resonator may be desirable for use in several applications, including in a field-focusing element. Accordingly, the ceramic layer 44 and metallic layer 42 are positioned to be compact, with as small an air gap in between the turns 46 as is technically and/or economically feasible for a desired application. In one embodiment, the air gap between the successive turns 46 is less than about 1 μm. In a further embodiment, the turns are placed less than about 100 nm apart. In an exemplary embodiment, there is no air gap between the metal and ceramic layers and the successive turns 46. A structure having "no air gap" between the turns is hereby defined as the structure wherein a measurable reduction in the advantageous properties of the compact Swiss-roll structure introduced by the spacing between the turns of Swiss-roll is less than 5%.

Depending on the application, the Swiss-roll structured resonator may be configured in various sizes. In one embodiment, the resonator is configured to have an inner diameter 60 (FIG. 4) of the Swiss-roll in a range from about 5 mm to about 100 cm and the outer diameter 62 in a range from about 5 mm to about 300 cm.

The ceramic layer 44 includes ceramic dielectric materials that are configured to have high dielectric constant and low dielectric loss at the desired frequency ranges. In one embodiment, the ceramic dielectric materials are as described in the applications with Ser. No. 13/075,911 and Ser. No. 13/075,997, both titled "DIELECTRIC MATERIALS", filed on 30 Mar. 2011 and incorporated herein by reference in their entirety. In one embodiment, the ceramic layer 44 is essentially free of any polymeric material. In one embodiment, the ceramic dielectric material comprises a titanate, such as an alkaline-earth titanate. In one embodiment, the ceramic dielectric material comprises a cation and/or anion-doped alkaline-earth titanate.

One embodiment of the present invention is a method of forming a Swiss-roll structured resonator. Formation of a compact, Swiss-roll structured metallic and ceramic layer combination includes many processing challenges. For example, the difference in melting, sintering, or softening points of different metals and ceramics hinders achievement of the desired properties of the resonator. Thermal expansion difference and differing sintering behaviors may induce cracks or gaps in the Swiss-roll structure. The material behavior may change in the presence of other materials.

In one embodiment, the Swiss-roll structure including a ceramic and metallic layer with multiple turns is formed using a combined heat-treatment of the layers. As a part of the process, in the initial step, a metal substrate layer is disposed. The metal substrate may be a self-standing metal strip or film or a layer of metallic powder or slurry disposed on a supporting sacrificial layer such as a polymer tape, for example a cellophane or polyurethane tape. A layer of ceramic powder or slurry is deposited on the metal substrate layer. The deposition of metal and ceramic powders or slurries may be carried out by standard disposition methods including doctor blading, paint brushing, air brushing, and tape casting. In one embodiment, the resultant multilayered assembly is further laminated or cold-isostatically pressed. The multilayered assembly is then wound to form a Swiss-roll structure and heat treated to get the final Swiss-roll resonator form.

The heat treatment is normally conducted in a non-oxidizing atmosphere to avoid oxidation of the metallic layer, thereby preventing a property change of the metals of the metallic layer. A vacuum, inert atmosphere, or reducing atmosphere are non-limiting examples of a non-oxidizing atmosphere in which to heat treat the structure. The materials, particle sizes, and the composition of materials of metallic layer 42 and ceramic layer 44 are chosen as described above to assist in achieving proper adhesion between the metal and ceramic layers after sintering. In an alternative embodiment, the green Swiss-roll structure 90 is hot-isostatically pressed instead of heat treating in a furnace 92.

In one embodiment, a buffer layer (not shown) is disposed over the metallic layer 42 before depositing the ceramic layer 44. The buffer layer generally assists in increasing the adherence of ceramic layer 44 to metallic layer 42 and may have a composition that does not change the properties of metallic or ceramic layer. In one embodiment, the buffer layer has the same composition as that of the metallic layer, but may have an increased chemical reactivity to adherence of ceramic layer compared to the metallic layer 42. The metallic layer 42 and buffer layer herein collectively referred to as the metallic substrate layer. In another embodiment, the buffer layer has a similar composition as that of ceramic layer, but has an increased reactivity to the metallic layer 42, for example, due to reduced sizes of the ceramic buffer layer.

Figure 5:
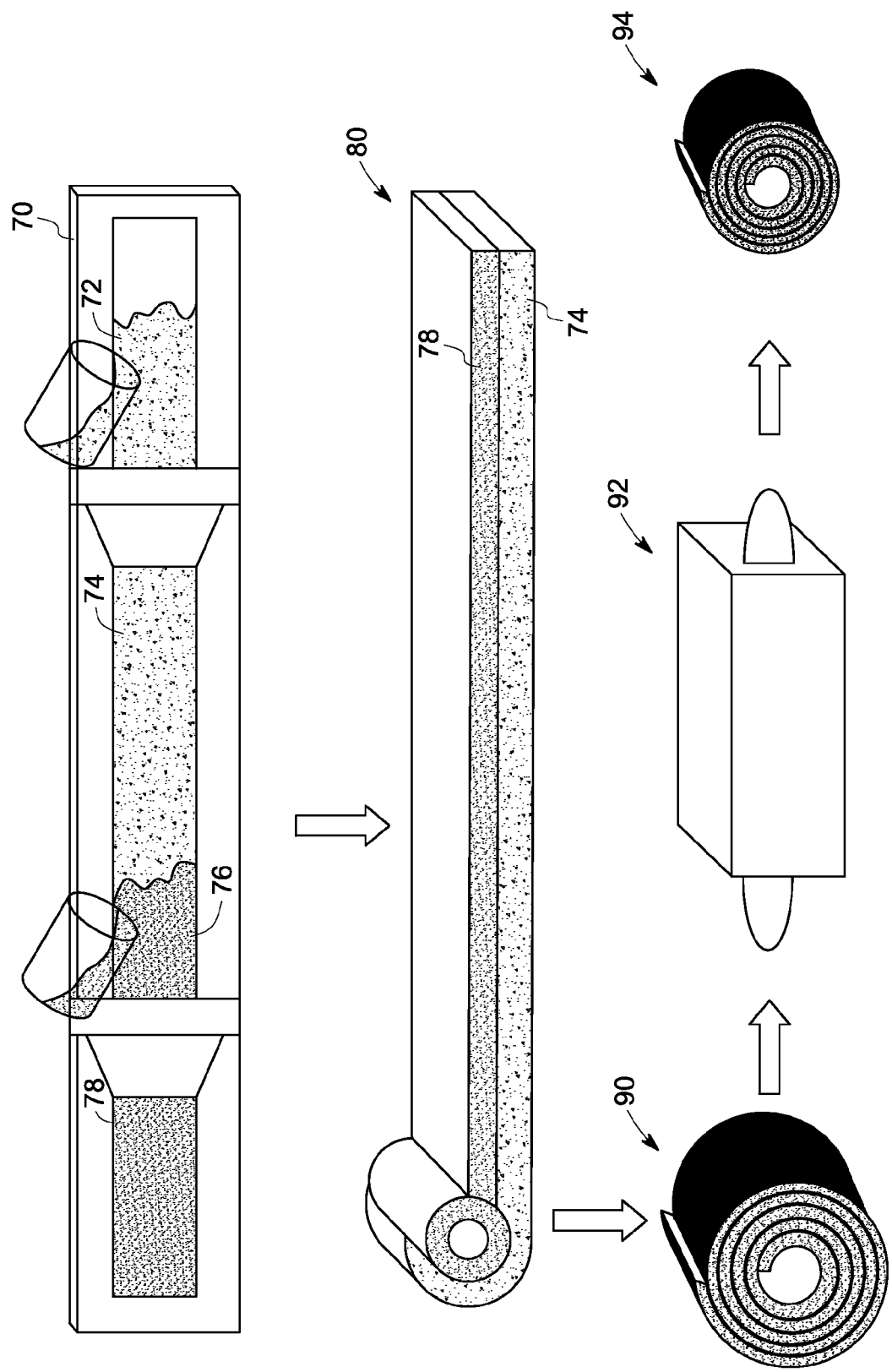
FIG. 5 illustrates an example of forming a Swiss-roll structure, according to an embodiment of the invention.

In an embodiment, the metallic substrate layer is formed by disposing metallic powders or slurries on a sacrificial holder 70 as depicted in FIG. 5. A metallic powder or slurry 72 is disposed on the sacrificial holder 70 to form the metallic layer 74. After optionally disposing a buffer layer (not shown) in a similar manner, a ceramic powder or slurry 76 is deposited over the metallic layer 74 to form a ceramic layer 78. A ceramic slurry 76 may have a certain amount of binders and sintering aids depending on the composition of ceramic dielectric material, required viscosity or density of the slurry and preferred sintering temperature of the ceramic layer 78. Depending on the methods used for disposing the metal 74 and ceramic layer 78 and the required green density of these layers 74, 78, the metal and ceramic layers may be optionally subjected to lamination via rolling, resulting in a laminated metal-ceramic green layer 80. The combined metallic layer 74 and ceramic layer 78 or the metal-ceramic green layer 80 is then subjected to winding to form a green Swiss-roll structure 90.

The green Swiss-roll structure 90 is suitably heat treated in a furnace 92 to get the sintered Swiss-roll resonator structure 94. The furnace 92 may be a single-stage furnace or a multi-stage furnace with temperature and atmospheric control. For example, if a polymer-based sacrificial holder and/or a polymer based binder or other additive is involved in the process of forming the green Swiss-roll structure 90, an additional or intermediate step of removing the polymer parts before heat-treating the metal-ceramic part is conducted in an oxidizing atmosphere such as, for example, air or oxygen at a temperature low enough to minimize oxidation of the metallic layers. After this optional removal step, the green Swiss-roll structure 90 is subjected to sintering in a non-oxidizing atmosphere.

The temperature of sintering may vary largely depending on the material of metallic layer 74, ceramic layer 78 and required density of the sintered Swiss-roll structure 94. In general, the material of the ceramic layer 78 is chosen to have desired dielectric properties as described earlier and to have sintering temperatures similar to or below that of the material of the metallic layer 74. In one embodiment, the green Swiss-roll structure 80 is heat treated to obtain a sintered Swiss-roll structure 94 that has an integrated monolithic structure, wherein the metallic and ceramic layer in the form of Swiss-roll are physically not separable, during the handling and application of the Swiss-roll structure, and has a density greater than about 98% by volume.

Figure 6:
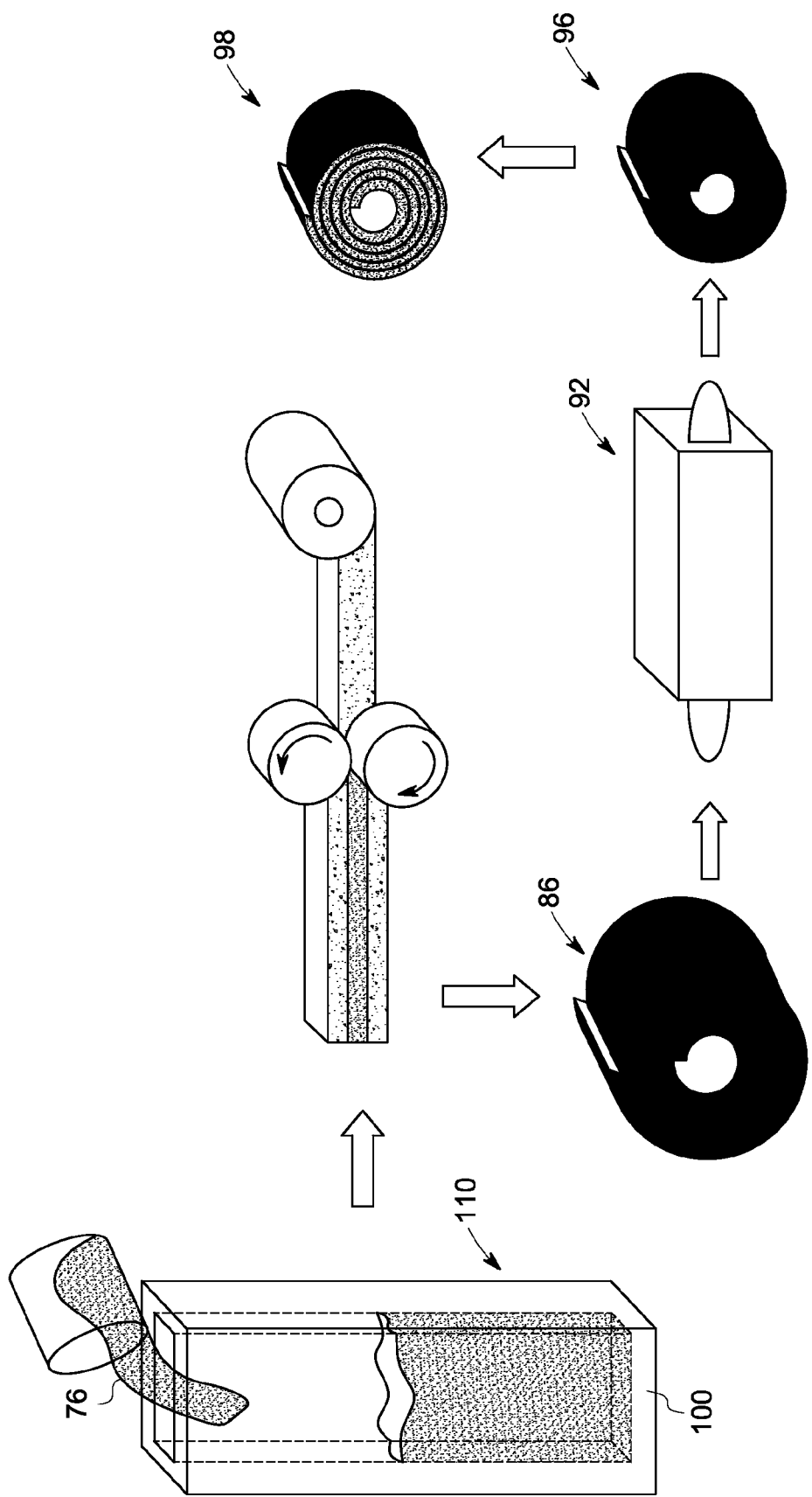
FIG. 6 illustrates example of forming a Swiss-roll structure, according to an embodiment of the invention.

FIG. 6 provides an example of an alternate method of forming a sintered Swiss-roll structure 94 having ceramic and metallic layers. A metal tube 100 is at least partially filled with ceramic slurry 76 to get a ceramic-containing metal structure 110. Shape and dimension of the metal tube 100 may be selected based on the final required dimension of the metallic layer 74. The ceramic containing metal structure 110 is subjected to working, such as swaging or rolling, to obtain a worked structure 84. The method and pressure applied in working depends on the characteristics of metal and ceramic materials and required final dimension of the sintered Swiss-roll structure. The worked structure 84 is wound to form the green Swiss-roll structure 86 and heat treated to obtain the sintered Swiss-roll structure 96. The outer edges of the sintered Swiss-roll structure 96 are machined or chemically etched to expose the alternative ceramic and metallic layer of the formed Swiss-roll structure 98.

EXAMPLES

The following examples illustrate methods and embodiments in accordance with the invention, and as such, should not be construed as imposing limitations upon the claims.

In one example, a sintered Swiss-roll structure 94 is prepared using the steps mentioned herein. A copper strip was prepared by cold working. The stresses of the cold worked metal strip were removed by heat treating the metal strip in an argon atmosphere at a temperature about 750° C., and cooling it at a slow rate. In an alternate example, the metallic strip was formed using hot working. The metallic strip formed by cold working or hot working was flattened using a hammer. The metallic surface was further rubbed using an emery paper of grit size 60 to prepare a rough surface configured to have sufficient interactions with the subsequent overlaying ceramic layer. Techniques such as sand blasting could be used alternatively for the surface preparation of metallic strip.

The surface-prepared metal strip was laid flat. Fine copper powders of less than about 5 micro meters were washed using dilute (0.1 M) HCl to remove oxide impurities and later mixed with about 5 wt % PVA (poly vinyl alcohol) solution. Amount of PVA solution added was carefully restricted to less than 10 wt % to avoid agglomeration during later steps. Distilled water was added to this resultant mixture till a thick paste of metal was obtained. The resultant addition of water was less than about 30 wt % of the initial copper-PVA mixture. The metal paste was laid over the metallic strip as a buffer layer by using tape casting technique to a thickness of about 0.1 mm to about 1 mm A dielectric ceramic powder containing $CaCu_3Ti_4O_{12}$, with a sintering temperature of 1050° C., was mixed with a solution of lithium carbonate and boron oxide sintering additives, and with 5 wt % PVA solution. A thick paste of ceramic powder was formed by drop-wise addition of distilled water, and the paste was tape casted over the copper layer to a thickness of about 1 mm.

The formed triple layers of metallic strip, buffer layer, and ceramic layer were dried in an open atmosphere for around 2-3 hours and then rolled around a cylindrical rod that had an outer diameter equal to the desired inner diameter of the green Swiss-roll structure, to form the green body of the Swiss-roll. The condition was optimized such that the layers were not too wet to lead to slipping, and not too dry to develop cracks on its surface. The rolled structure was vacuum sealed and then pressed under cold isostatic press (CIP) at a pressure of greater than about 30 MPa. The structure was then separated from the cylindrical rod to obtain a green body of the Swiss-roll structure. The resultant structure was then heated in oven at 100° C. to remove excess water absorbed by the green structure during CIP.

The green structure of the Swiss-roll was heated in ambient air or oxygen atmosphere up to 250° C. The structure was kept at 250° C. for 6 hours for binder burnout. The structure was then heated to its sintering temperature (1150° C.) with a heating rate of about 1° C. per minute. The structure was kept at its sintering temperature for 24 hours. The sintered structure was finally cooled down with a slow cooling rate of 1° C. per minute. A low value of heating and cooling rate, and a high dwelling time was used to maintain the integrity of the complex Swiss-roll structure. The sintered Swiss-roll structure was polished to remove and isolate any copper cross contacts on the top surface of the Swiss-roll.

In an alternate example, about 1 mm thick layer of copper slurry was formed over a paper tape using a doctor blade technique, thereby eliminating the metal strip to hold the copper.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming a resonator, comprising:
   disposing a metallic layer;
   providing a buffer layer over the metallic layer;
   depositing a dielectric ceramic layer over the buffer layer;
   forming a Swiss-roll structure of the metallic layer and the ceramic layer; and
   heat treating the Swiss-roll structure in a vacuum, inert atmosphere, or reducing atmosphere to form a monolithic Swiss-roll structure, wherein an air gap between turns of the Swiss-roll structure is less than about 1 µm.

2. The method of claim 1, wherein the metallic layer is prepared by disposing metallic powders.

3. The method of claim 1, wherein the heat treating of the metallic layer, buffer layer, and ceramic layer of the Swiss-roll structure obtains an integrated monolithic structure of density greater than 98% by volume.

4. The method of claim 3, wherein the temperature of the heat treatment is less than the melting point of the metallic layer.

5. A method of forming a resonator, comprising:
   filling-in a metallic hollow tube with a dielectric ceramic material to form a filled metallic tube;
   swaging or rolling of the filled metallic tube to form a layered structure comprising a ceramic layer in between two metallic layers;
   winding the layered structure to form a Swiss-roll structure from the two metallic layers and the ceramic layer; and
   heat treating the Swiss-roll structure in a vacuum, inert atmosphere, or reducing atmosphere to form a monolithic Swiss-roll structure, wherein an air gap between turns of Swiss-roll structure is less than about 1 µm.

6. The method of claim 5, further comprising machining or chemically etching outer edges of the Swiss-roll structure to expose the ceramic and the two metallic layers.

* * * * *